(12) United States Patent  (10) Patent No.: US 10,000,654 B2
Brooks et al.  (45) Date of Patent: Jun. 19, 2018

(54) AUTOMOTIVE PLASTIC PANEL

(71) Applicant: FLEX-N-GATE CORPORATION, Urbana, IL (US)

(72) Inventors: Geoffrey Brooks, Macomb, MI (US); Guido Benvenuto, LaSalle (CA)

(73) Assignee: FLEX-N-GATE CORPORATION, Urbana, IL (US)

( * ) Notice: Subject to any disclaimer, the term of this patent is extended or adjusted under 35 U.S.C. 154(b) by 221 days.

(21) Appl. No.: 14/639,997

(22) Filed: Mar. 5, 2015

(65) Prior Publication Data

US 2016/0257839 A1  Sep. 8, 2016

(51) Int. Cl.
C09D 133/12 (2006.01)
B32B 27/36 (2006.01)
B32B 27/08 (2006.01)
B32B 27/30 (2006.01)
B29C 45/14 (2006.01)
(Continued)

(52) U.S. Cl.
CPC ........ C09D 133/12 (2013.01); B29C 37/0025 (2013.01); B29C 45/0001 (2013.01); B29C 45/14 (2013.01); B32B 7/02 (2013.01); B32B 27/08 (2013.01); B32B 27/18 (2013.01); B32B 27/308 (2013.01); B32B 27/365 (2013.01); B60J 1/00 (2013.01); B60J 1/2094 (2013.01); B29K 2033/12 (2013.01); B29K 2105/20 (2013.01); B29K 2669/00 (2013.01); B29K 2995/0018 (2013.01); B29L 2009/005 (2013.01); B29L 2031/3005 (2013.01); B32B 2250/24 (2013.01); B32B 2307/584 (2013.01); B32B 2307/71 (2013.01); Y10T 428/2495 (2015.01); Y10T 428/24967 (2015.01)

(58) Field of Classification Search
CPC ...... B32B 27/365; B32B 27/308; B32B 27/08
See application file for complete search history.

(56) References Cited

U.S. PATENT DOCUMENTS

2006/0204746 A1  9/2006 Li et al.
2006/0209551 A1* 9/2006 Schwenke ............... B32B 27/08
  362/503

(Continued)

FOREIGN PATENT DOCUMENTS

JP  2006035519 A  *  2/2006
WO  WO 2006/005090 A1  1/2006
(Continued)

OTHER PUBLICATIONS

Machine translation of JP2006035519. Retrieved Jul. 21, 2017.*
(Continued)

Primary Examiner — Prashant J Khatri
(74) Attorney, Agent, or Firm — Foley & Lardner LLP

(57) ABSTRACT

A plastic panel suitable for use in an automotive vehicle or other structure is provided wherein the plastic panel includes a polycarbonate substrate, a PMMA layer and a scratch resistant coating. The polycarbonate substrate may have a thickness approximately between 2.0 mm and approximately 6.0 mm. The PMMA layer may be disposed onto the polycarbonate substrate and the PMMA layer may have a thickness approximately between 0.25 mm and approximately 3.0 mm. The scratch resistant coating is applied to both the PMMA layer and the PC substrate.

17 Claims, 2 Drawing Sheets

(51) Int. Cl.
    *B29C 45/00*     (2006.01)
    *B29C 37/00*     (2006.01)
    *B32B 27/18*     (2006.01)
    *B32B 7/02*     (2006.01)
    *B60J 1/00*     (2006.01)
    *B60J 1/20*     (2006.01)
    *B29K 33/00*     (2006.01)
    *B29K 105/20*     (2006.01)
    *B29K 669/00*     (2006.01)
    *B29L 9/00*     (2006.01)
    *B29L 31/30*     (2006.01)

(56) References Cited

U.S. PATENT DOCUMENTS

| | | | |
|---|---|---|---|
| 2007/0212548 A1* | 9/2007 | Lefaux | B05D 7/04 |
| | | | 428/411.1 |
| 2008/0265459 A1 | 10/2008 | Gasworth et al. | |
| 2011/0212318 A1 | 9/2011 | Loebel et al. | |
| 2012/0177929 A1* | 7/2012 | Meyer Zu Berstenhorst | B32B 27/18 |
| | | | 428/412 |

FOREIGN PATENT DOCUMENTS

| | | |
|---|---|---|
| WO | WO 2006/072177 A1 | 7/2006 |
| WO | WO 2008/134771 A1 | 11/2008 |
| WO | WO 2014/107498 A1 | 7/2014 |

OTHER PUBLICATIONS

"Technical Information: UV Filters" BASF, (2011); pp. 1-18.*
Lorca et al. "Preparation of PMMA Nanoparticles Loaded with Benzophenone-3 through Miniemulsion Polymerization", Macromolecular Symposia, (2012); pp. 246-250.*
EPO Extended Search Report dated Jul. 9, 2016 for Application No. 16158583.1, 9 pages.

* cited by examiner

AUTOMOTIVE PLASTIC PANEL

BACKGROUND

The present disclosure relates to automotive plastic panels used throughout the vehicle which include but are not limited to headlamp panels, windshields, fixed side windows and drop down door windows.

Traditionally, glazing has used glass material for automotive applications. Polycarbonate is a material that lends itself due to its characteristics for vehicle glazing. Polycarbonate is a clear-sighted material with extremely high impact strength, restoring properties after mechanical impact, high temperature resistance and high transparency. Polycarbonate is very suitable for glazing in automotive vehicles. However, the properties of polycarbonate glazings create challenges non-existent in glass glazings. For example, the polycarbonate glazings preferably must be protected against abrasion and preferably, processes must be developed to incorporate various functional elements within polycarbonate glazings. Furthermore, polycarbonate can expand and contract more than glass. Accordingly, polycarbonate can present issues that do not exist with existing glass glazing technology given polycarbonate's poor weatherability characteristics.

When polycarbonate has been implemented on a vehicle, the polycarbonate lens has been previously protected with a UV protective varnish. However, the UV protective varnish can degrade over time leaving the material to be prone to degradation due to the environment.

Accordingly, a need has developed to have a multi-layered plastic panel for use in automotive vehicles wherein the plastic panel has both high impact strength and can withstand various weather conditions without comprising strength.

DETAILED DESCRIPTION

As required, detailed embodiments of the present invention are disclosed herein. However, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Embodiments disclosed herein relate to a plastic panel 10 which may be used where reduced weight (relative to glass), improved styling freedom, high impact strength and enhanced weathering characteristics are desired. While it is understood that the plastic panel may be implemented in a structure such as a building, it is understood that more particularly, the exemplary embodiments relate to a glazed plastic panel which may be used in a vehicle.

Figure 1:
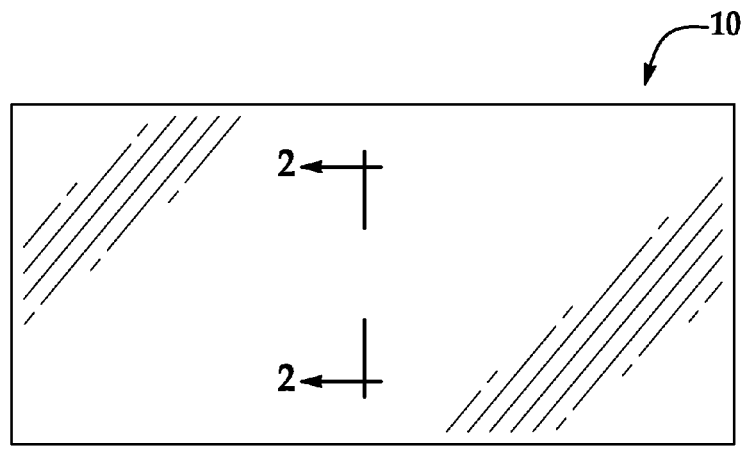
FIG. 1 is a plan view of a section of a first embodiment of the present disclosure.
Figure 2:
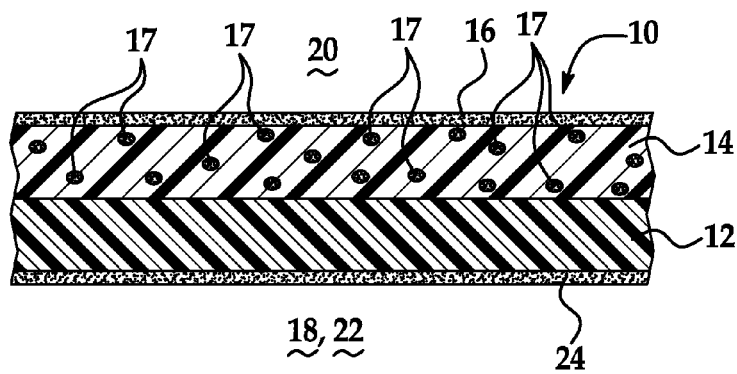
FIG. 2 is a cross-sectional schematic view of the first embodiment of the present disclosure along lines 2-2 in FIG. 1.

Referring now to FIGS. 1 and 2, the glazed plastic panel 10 of the present disclosure includes a polycarbonate substrate 12 and a polymethylmethacrylate layer 14 (hereinafter referred to as "PMMA") which is disposed onto the polycarbonate substrate 12. It is understood that there are various methods upon which the PMMA is disposed onto the polycarbonate substrate, such as, but not limited to an injection molding method. In order to resolve issues relating to expansion and contraction of the polycarbonate substrate 10 and PMMA layer 14 under extreme temperatures as well as providing optimum impact strength, the polycarbonate substrate 12 should have a thickness which is approximately in the range of 2.0 mm to 6.00 mm and the PMMA layer 14 should preferably have a thickness which is approximately in the range of 0.25 mm to 3.0 mm. In light of the aforementioned ranges, it is understood that the polycarbonate substrate may form 90 percent of the total thickness of the entire plastic panel while the PMMA layer may form approximately 10 percent of the total panel thickness. Accordingly, one non-limiting example of the present disclosure includes a layered construction wherein the ratio between the thicknesses of each of the polycarbonate substrate 12 to the PMMA layer 14 is 9:1 respectively.

Furthermore, in view of the above ranges, it is further understood that the thickness of the PMMA layer 14 may also be approximately 5% of the thickness of the polycarbonate substrate 12 in yet another non-limiting exemplary embodiment. Accordingly, in this example, the thickness ratio of the polycarbonate to the PMMA layer may be 19:1. However, it is understood that the thickness ratio of the different materials can deviate from 19:1 as long as the polycarbonate substrate 12 and the PMMA layer 14 are maintained in the aforementioned approximate ranges in order to provide optimum performance when subjected to a load.

It is further understood that it is beneficial to provide the PMMA layer 14 between the outside environment 20 (heat, sun, rain, snow, etc.) and the polycarbonate substrate 12 because the PMMA layer 14 is resistant to degradation due to the weathering elements. Furthermore, it is understood that the PMMA layer 14 may include UV absorbing material 15 such as but not limited to encapsulated benzophenone-3 (TB-MS), avobenzone (TA-MS), octyl methoxycinnamate (TO-MS) and diethylamino hydroxybenzoyl hexyl benzoate (TD-MS). Accordingly, the PMMA layer having the UV absorbing material serves as filtering agent and provides weathering performance while the polycarbonate substrate serves as base providing the needed structural performance.

With reference back to FIG. 2, a scratch resistant coating 16 may be applied to the both the PC layer 12 and the PMMA layer 14. It is understood that one non-limiting example of the scratch resistant coating is hard coat 3. The scratch resistant coating 16 further protects the plastic panel from impacts and abrasion sustained from the outside environment 20 of the vehicle. As shown in FIG. 2, the polycarbonate substrate 12 is exposed to one of the interior 18 of the vehicle or an enclosed area in the vehicle. Non-limiting examples of such a plastic panel 10 may be the door window of the vehicle (where the secondary scratch resistant coating 24 is exposed to the vehicle interior 18) or a headlamp lens (where the inner surface is exposed to the chamber defined by the headlamp lens and reflector). It is also understood that a secondary scratch resistant coating 24 may be applied to the polycarbonate substrate 12 (which is exposed to the interior 18 of the vehicle) so that the plastic panel 10 can withstand any impacts from the interior 18 of the vehicle.

Figure 3:
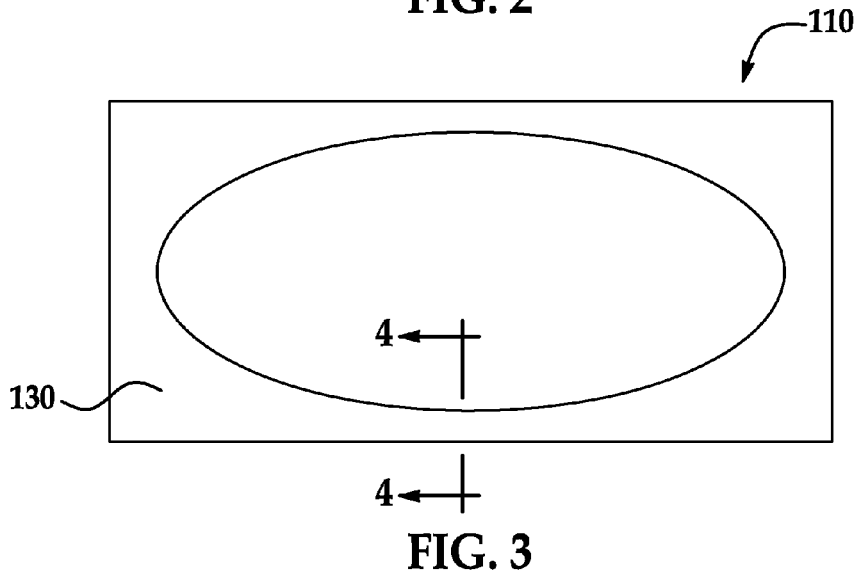
FIG. 3 is a plan view of a section of a second embodiment of the present disclosure.
Figure 4:
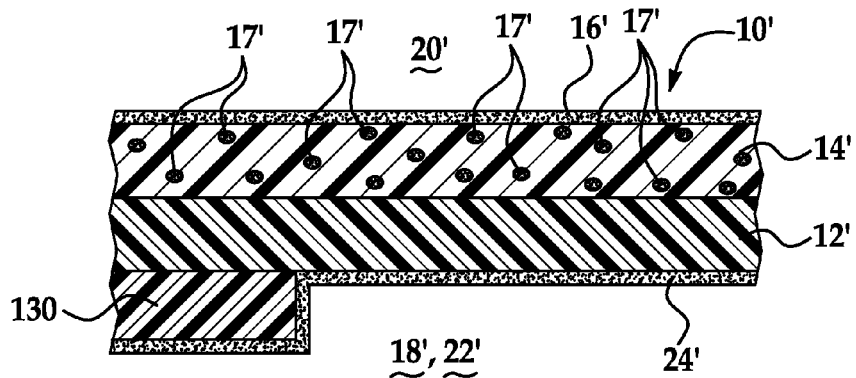
FIG. 4 is a cross-sectional schematic view of the second embodiment of the present disclosure along lines 4-4 in FIG. 3.

Referring now to FIGS. 3 and 4, a second embodiment of the present disclosure is provided wherein the plastic panel 10' includes a polycarbonate substrate 12', a PMMA layer 14', a blackout layer 130, a scratch resistant coating 16' and a secondary scratch resistant coating 24'. The polycarbonate substrate 12' in this embodiment may also have a thickness approximately between 2.0 mm and approximately 6.0 mm. The PMMA layer 14' is disposed onto the polycarbonate substrate 12' using an injection molding process. This attachment method provides for a robust construction as the material is subjected to extreme temperatures and may expand or contract accordingly. It is understood that in this embodiment, the PMMA layer 14' should also have a thickness approximately between 0.25 mm and approximately 3.0 mm. The blackout layer is disposed onto the polycarbonate substrate 12' on the side which is opposite to the side having the PMMA layer 14'. The blackout layer helps to hide adhesive and attachments used to affix the window to the vehicle. The blackout layer may be formed from an opaque polymeric material.

Furthermore, it is understood that the PMMA layer 14' may include UV absorbing material 15' such as but not limited to encapsulated benzophenone-3 (TB-MS), avobenzone (TA-MS), octyl methoxycinnamate (TO-MS) and diethylamino hydroxybenzoyl hexyl benzoate (TD-MS). Accordingly, the PMMA layer 14' having the UV absorbing material 15' serves as a filtering agent and provides weathering performance while the polycarbonate substrate serves as base providing the needed structural performance.

The plastic panel 10' of this embodiment further includes the secondary scratch resistant coating 24' being exposed to one of the interior 18' of the vehicle or an enclosed area 22' in the vehicle. Non-limiting examples may be a fixed side window the door window of the vehicle (where secondary scratch resistant coating 24' is exposed to the vehicle interior 18') or a headlamp lens (where the secondary scratch resistant coating 24' is exposed to the chamber 22' defined by the headlamp lens and reflector).

Similar to the first embodiment, the PMMA layer 14' of the second embodiment may have thickness which is approximately 5% of the thickness of the polycarbonate substrate 12'. Therefore, the second embodiment may, but not necessarily, have a 19:1 thickness ratio between the polycarbonate substrate 12' and the PMMA layer 14'. Regardless of the ratio, it is understood that the PMMA layer 14' and the polycarbonate substrate 12' are maintained in the approximate thickness ranges—approximately between 2.0 mm and 6.0 mm for the polycarbonate substrate 12' and approximately between 0.25 mm and 3.0 mm for the PMMA layer 14'. It is understood that the aforementioned ranges in the material result in a plastic panel having optimum performance characteristics when the panel 10 is subjected to a load as well as weathering conditions.

With reference back to FIG. 4, a scratch resistant coating 16' may be applied to the PMMA layer 14' to further protect the plastic panel 10' from outside elements such as debris, rain, hail, dust, snow, etc. It is understood that one non-limiting example of the scratch resistant coating is a hard coat 3. Moreover, as shown in FIG. 4, at least a portion of the polycarbonate substrate 12' is exposed to the interior 18' of the vehicle or an enclosed area 22' of the vehicle such as a headlamp chamber. It is further understood that a secondary scratch resistant coating 24' is applied to the polycarbonate substrate 12' and the blackout layer 130 to protect the panel 10' against any impact sustained from the interior 18 of the vehicle.

Figure 5:
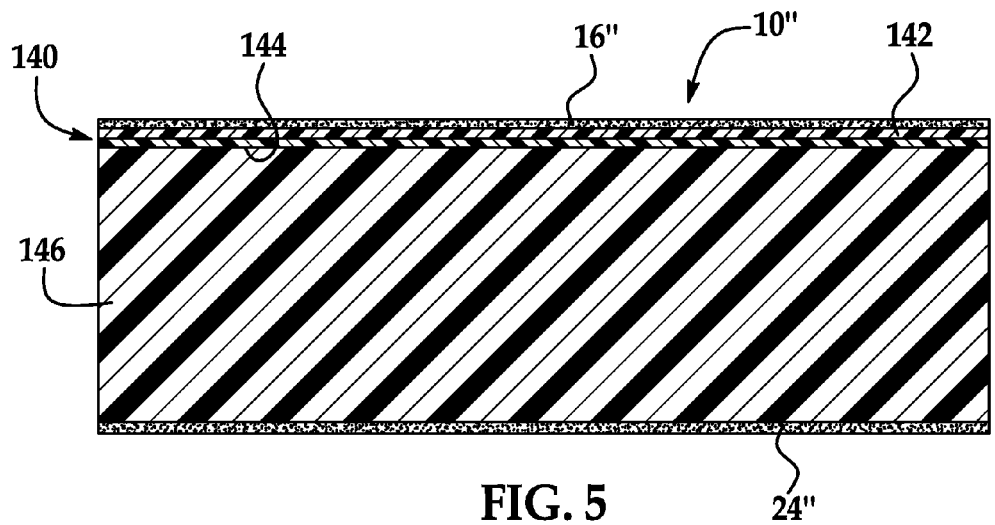
FIG. 5 is a cross-sectional schematic view of a third embodiment of the present disclosure.
Figure 6:
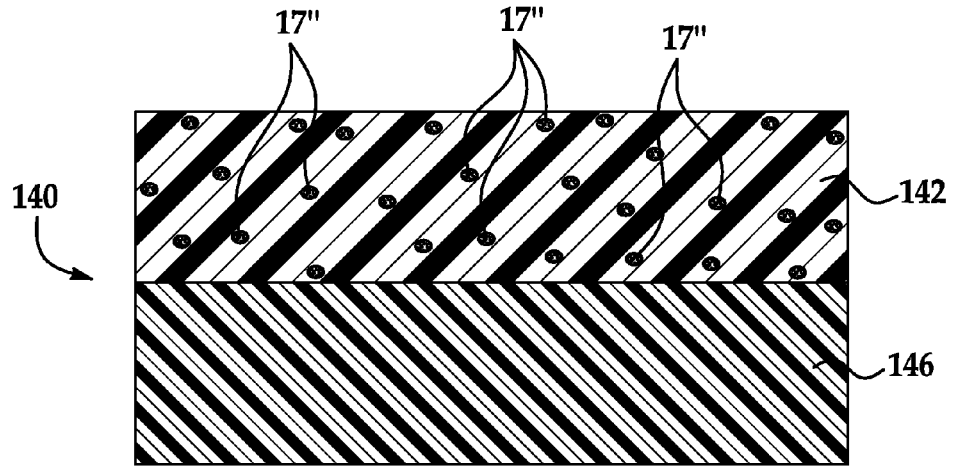
FIG. 6 is a magnified schematic view of the hybrid film of FIG. 5.

With reference to FIGS. 5 and 6, another embodiment of the present disclosure is shown where the plastic panel implements a hybrid film 140. Similar to the first and second embodiments, a scratch resistant coating 16" may be applied to the hybrid film 140 and a secondary scratch resistant coating 24" may be applied to the polycarbonate substrate 12". The total thickness of the hybrid film 140 may be in the range of approximately 0.25 to 1.0 mm. The hybrid film 140 is formed from two layers. The outermost layer is a PMMA film layer 142 with UV absorbers 17" and the inner film layer is a polycarbonate film layer 144. The PMMA film layer 142 may include UV absorbing material 17" such as but not limited to encapsulated benzophenone-3 (TB-MS), avobenzone (TA-MS), octyl methoxycinnamate (TO-MS) and diethylamino hydroxybenzoyl hexyl benzoate (TD-MS). The hybrid film 140 having the combined PMMA film layer 142 and the polycarbonate film layer 144 may be inserted into an injection mold and a polycarbonate layer 146 may be injected behind the hybrid film 140. The hybrid film 140 may be pre-formed (thermoformed) and the inserted into a mold for complex geometries. Alternatively, the hybrid film 140 may be fed directly into the mold in sheet form for simple geometries. It is further understood that the rigid panel polycarbonate layer 144 may also be injection molded or overmolded onto the hybrid film 140.

As shown in FIG. 5, the polycarbonate substrate 146 may have a thickness in the approximate range of 2.0 to 6.0 mm. This construction provides for a robust design that can withstand impacts due to the unitary rigid polycarbonate substrate 146 which forms the panel. Furthermore, similar to previous embodiments, the plastic panel 10" shown in FIG. 5 also filters unwanted UV light via the hybrid film 140.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. A plastic panel suitable for use in an automotive vehicle, the plastic panel consisting of:
   a polycarbonate substrate having a first side and a second side that is opposite the first side;
   a hybrid film disposed on the polycarbonate substrate, the hybrid film comprising:
      a polycarbonate film layer disposed directly on the first side of the polycarbonate substrate; and
      a PMMA film layer disposed directly on a side of the polycarbonate film layer that is opposite the polycarbonate substrate, the PMMA film layer having a UV absorbing material;
   a first single layer of scratch resistant coating disposed directly on a side of the PMMA film layer that is opposite the polycarbonate film layer; and
   a second single layer of scratch resistant coating disposed directly on the second side of the polycarbonate substrate.

2. The plastic panel of claim 1, wherein the polycarbonate substrate has a thickness and the hybrid film has a thickness that is approximately 5% of the thickness of the polycarbonate substrate.

3. The plastic panel of claim 1, wherein the polycarbonate substrate has a thickness in the range of 2.0 mm to 6.0 mm, and the hybrid film layer has a thickness in the range of 0.25 mm to 1.0 mm.

4. The plastic panel of claim 1, wherein the UV absorbing material comprises at least one material selected from the group consisting of encapsulated benzophenone-3, avobenzone, octyl methoxycinnamate, and diethylamino hydroxybenzoyl hexyl benzoate.

5. The plastic panel of claim 1, wherein the polycarbonate substrate is overmolded onto the hybrid film.

6. A plastic panel suitable for use in an automotive vehicle, the plastic panel comprising:
   a polycarbonate substrate being approximately between 2.0 mm and approximately 6.0 mm thick, the polycarbonate substrate having a first side and a second side that is opposite the first side;
   a hybrid film disposed onto the polycarbonate substrate, the hybrid film comprising:
      a polycarbonate film layer disposed onto the first side of the polycarbonate substrate; and
      a PMMA film layer disposed onto the polycarbonate film layer and comprising a UV absorbing material;
   a first scratch resistant coating as a single layer that forms an outermost layer of the plastic panel and that is disposed directly onto the PMMA film layer of the hybrid film; and
   a second scratch resistant coating as a single layer that is disposed onto the second side of the polycarbonate substrate.

7. The plastic panel of claim 6 wherein the UV absorbing material comprises at least one material selected from the group consisting of encapsulated benzophenone-3, avobenzone, octyl methoxycinnamate, and diethylamino hydroxybenzoyl hexyl benzoate.

8. The plastic panel of claim 6 wherein the hybrid film is approximately 0.25 to 1.0 mm thick.

9. The plastic panel of claim 7 wherein the UV absorbing material comprises encapsulated benzophenone-3.

10. The plastic panel of claim 7 wherein the UV absorbing material comprises avobenzone.

11. The plastic panel of claim 7 wherein the UV absorbing material comprises octyl methoxycinnamate.

12. The plastic panel of claim 7 wherein the UV absorbing material comprises diethylamino hydroxybenzoyl hexyl benzoate.

13. The plastic panel of claim 6 wherein the hybrid film is a thermoformed material.

14. The plastic panel of claim 6 wherein the hybrid film is a sheet.

15. The plastic panel of claim 6 wherein a ratio between thicknesses of each of the polycarbonate substrate to the hybrid film is at least 19:1.

16. The plastic panel of claim 6 wherein the second scratch resistant coating forms an innermost layer of the plastic panel.

17. The plastic panel of claim 16, wherein the second scratch resistant coating is disposed directly onto the second side of the polycarbonate substrate.

* * * * *